United States Patent
Lesin et al.

(10) Patent No.: US 10,882,724 B1
(45) Date of Patent: Jan. 5, 2021

(54) REDUNDANT MULTI-POINT CHAIN HOIST APPARATUS

(71) Applicant: Wired Specialty Equipment LLC, Glendora, CA (US)

(72) Inventors: Arnold Lesin, Los Angeles, CA (US); Richard Adams, Monrovia, CA (US)

(73) Assignee: Wired Specialty Equipment, LLC, Lake Worth, FL (US)

( * ) Notice: Subject to any disclaimer, the term of this patent is extended or adjusted under 35 U.S.C. 154(b) by 0 days.

(21) Appl. No.: 16/989,465

(22) Filed: Aug. 10, 2020

(51) Int. Cl.
*B66D 3/22* (2006.01)
*F16H 1/22* (2006.01)

(52) U.S. Cl.
CPC . *B66D 3/22* (2013.01); *F16H 1/22* (2013.01)

(58) Field of Classification Search
CPC . B66D 3/003; B66D 3/18; B66D 3/20; B66D 3/22; B66D 3/26; F16H 1/22
See application file for complete search history.

(56) References Cited

U.S. PATENT DOCUMENTS

| | | | | |
|---|---|---|---|---|
| 188,425 A | * | 3/1877 | Sickels | B66D 3/26 226/77 |
| 189,914 A | * | 4/1877 | Blakeslee | B66D 3/26 226/77 |
| 2,969,954 A | | 1/1961 | Parker et al. | |
| 3,912,229 A | * | 10/1975 | Mitchell | B66D 1/26 254/295 |
| 6,182,945 B1 | | 2/2001 | Dyer et al. | |
| 6,598,859 B1 | | 7/2003 | Kureck et al. | |
| 10,099,904 B1 | | 10/2018 | Zaguroli, Jr. | |

FOREIGN PATENT DOCUMENTS

| | | | | |
|---|---|---|---|---|
| CN | 202148157 | | 2/2012 | |
| CN | 108996417 A | | 12/2018 | |
| DE | 3933505 A1 | | 4/1990 | |
| FR | 2338221 A1 | | 8/1977 | |
| FR | 2521541 A1 | | 8/1983 | |
| GB | 716999 A | * | 10/1954 | ............... B66D 3/22 |
| KR | 101048036 B1 | | 7/2011 | |
| WO | 2013122479 A1 | | 8/2013 | |
| WO | 2015176119 A1 | | 11/2015 | |

* cited by examiner

*Primary Examiner* — Sang K Kim
*Assistant Examiner* — Nathaniel L Adams
(74) *Attorney, Agent, or Firm* — Entralta P.C.; Justin G. Sanders; Peter D. Weinstein (57) ABSTRACT

A redundant multi-point chain hoist apparatus is disclosed. In at least one embodiment, the apparatus provides a motor, a first chain path sized and configured for slidably receiving a first chain, a separate, redundant second chain path sized and configured for slidably receiving a second chain, a first brake in mechanical communication with the first chain path, a second brake in mechanical communication with the second chain path, and a gear train. The gear train is configured for enabling the motor to selectively cause the first and second chains to move in unison yet independently via the separate first and second chain paths. In use, with the apparatus engaged with each of an elevated surface and a load, the apparatus is capable of selectively lifting, lowering and sustaining the load relative to the elevated surface via each of the first and second chains, even if one of the first or second chains, chain paths, or brakes should experience a failure.

19 Claims, 8 Drawing Sheets

REDUNDANT MULTI-POINT CHAIN HOIST APPARATUS

RELATED APPLICATIONS

Not applicable.

BACKGROUND

The subject of this patent application relates generally to hoists, and more particularly to a redundant multi-point chain hoist apparatus that provides at least two redundant load paths capable of sustaining an associated load even in the event of a failure.

Applicant hereby incorporates herein by reference any and all patents and published patent applications cited or referred to in this application.

By way of background, chain hoists traditionally utilize one or more load chains running along a single load path consisting of a drum, chain guides, rollers, etc. While such multi-chain hoists might be capable of sustaining the associated load in the event one of the chains should fail, the same would not be true if one or more of the load path components themselves were to fail. Some chain hoists have attempted to solve this problem by providing a completely redundant set of hoist components—i.e., two chains, two load paths, two motors, etc. However, such solutions effectively double the size (or at least the cost) of the chain hoists, while also typically requiring additional components for maintaining motor synchronization, thereby resulting in a less-than-ideal solution. Accordingly, there remains a need for a cost effective chain hoist that is capable of sustaining an associated load even in the event of a failure.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a redundant multi-point chain hoist apparatus that provides at least two redundant load paths capable of sustaining an associated load even in the event of a failure. In at least one embodiment, the chain hoist apparatus provides a motor, a first chain path sized and configured for slidably receiving a first chain, such that the first chain is capable of being selectively moved therethrough, a separate, redundant second chain path sized and configured for slidably receiving a second chain, such that the second chain is capable of being selectively moved therethrough, a first brake in mechanical communication with the first chain path for selectively preventing the first chain from moving through the first chain path, a second brake in mechanical communication with the second chain path for selectively preventing the second chain from moving through the second chain path, and a gear train. The gear train provides a plurality of gears configured for creating parallel mechanical links between the motor and each of the first and second chain paths, such that the motor selectively causes the first and second chains to move in unison yet independently via the separate first and second chain paths. In use, with the apparatus engaged with each of an elevated surface and a load, the apparatus is capable of selectively lifting, lowering and sustaining the load relative to the elevated surface via each of the first and second chains, even if one of the first or second chains, chain paths, or brakes should experience a failure.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
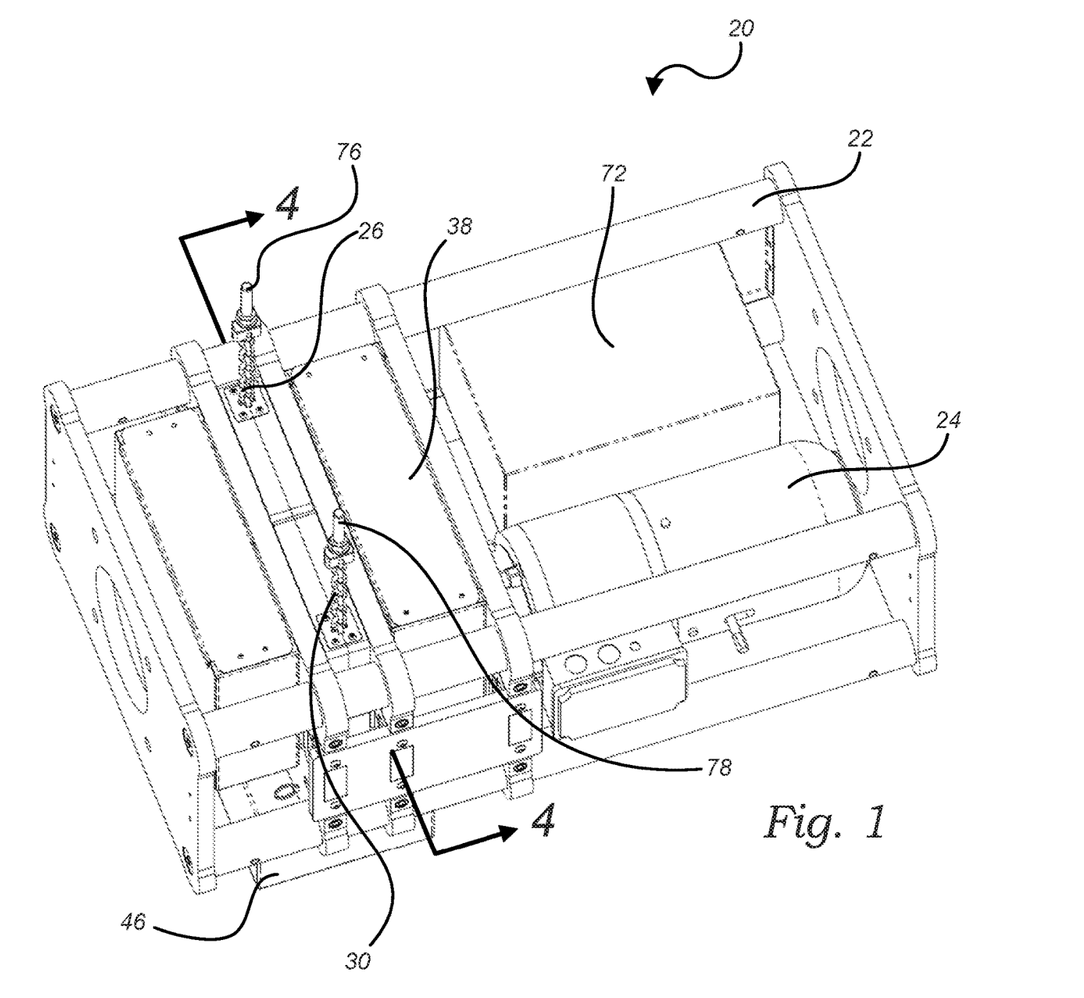
FIG. 1 is a perspective view of an exemplary redundant multi-point chain hoist apparatus, in accordance with at least one embodiment.
Figure 2:
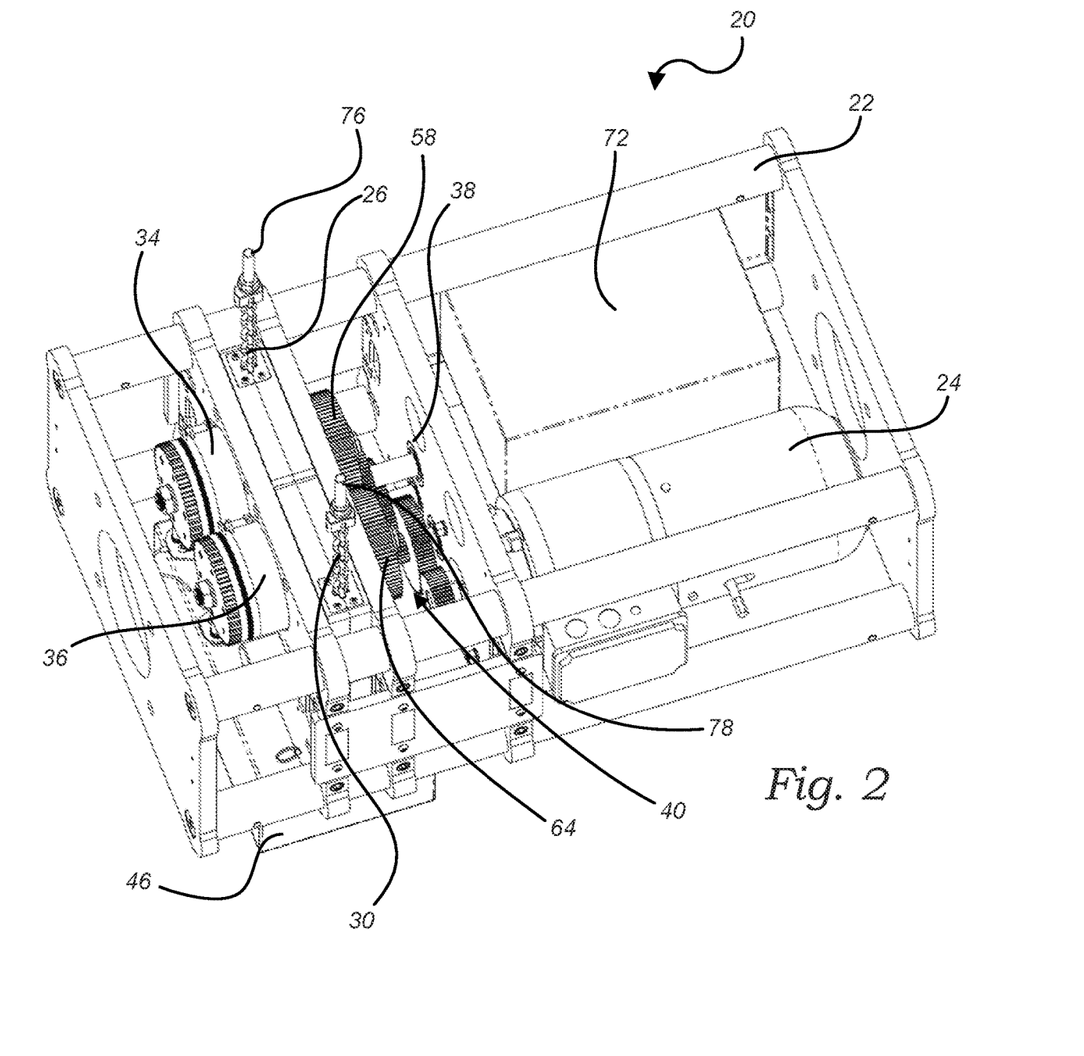
FIG. 2 is a further perspective view thereof, with a gearbox enclosure and brake enclosure omitted for illustrative purposes, in accordance with at least one embodiment.
Figure 3:
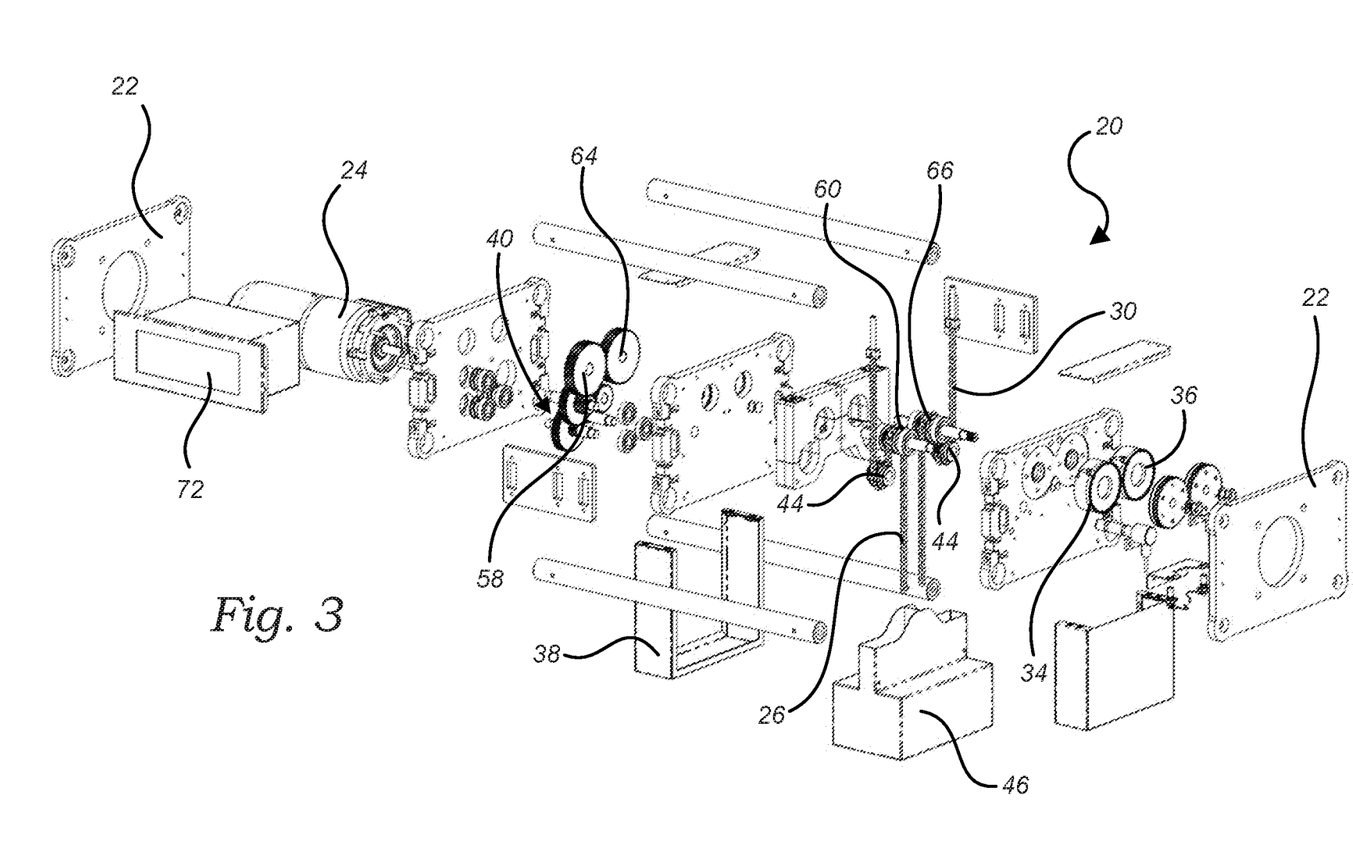
FIG. 3 is an exploded view thereof, in accordance with at least one embodiment.

Turning now to FIGS. 1-3, there are shown perspective views of an exemplary redundant multi-point chain hoist apparatus 20. In at least one embodiment, the apparatus 20 provides a housing 22 sized and configured for supporting a motor 24, a first chain 26 positioned within a first chain path 28, a second chain 30 positioned within a second chain path 32, a first brake 34 in mechanical communication with the first chain path 28, a second brake 36 in mechanical communication with the second chain path 32, and a gearbox 38 (containing a gear train 40 comprising a plurality of gears 42) positioned for creating parallel mechanical links between the motor 24 and each of the first and second chain paths 28 and 32. At the outset, it should be noted that the size, shape and dimensions of the housing 22 as depicted in the drawings (and as described herein) is merely exemplary; thus, in further embodiments, the housing 22 may take on any other size, shape and/or dimensions, now known or later developed, so long as the apparatus 20 is capable of substantially carrying out the functionality described herein. Similarly, the size, shape, dimensions and position of the motor 24 relative to the housing 22 as depicted in the drawings is merely exemplary, such that in further embodiments, the motor 24 may take on any other size, shape and/or dimensions, now known or later developed, and may be positioned and/or arranged elsewhere on the housing 22, so long as the apparatus 20 is capable of substantially carrying out the functionality described herein. In at least one still further embodiment, the motor 24 may be omitted altogether in lieu of a mechanism configured for enabling manual interaction with the gear train 40 (and, in turn, the first and second chain paths 28 and 32). Accordingly, the term "motor" as used herein is intended to include any such manual mechanisms, now known or later developed.

Additionally, the sizes, shapes, dimensions, quantities and positions of the gears 42 as depicted in the drawings is merely exemplary, such that in further embodiments, the gears 42 may take on any other sizes, shapes, dimensions and/or quantities, now known or later developed, and may be positioned and/or arranged elsewhere within the gearbox 38, so long as the apparatus 20 is capable of substantially carrying out the functionality described herein.

Furthermore, while the apparatus 20 is described primarily as providing only two sets of chains 26 and 30, chain paths 28 and 32, and brakes 34 and 36, in at least one further embodiment, the apparatus 20 provides more than two sets of chains, chain paths and brakes. In such further embodiments, each chain path 28 and 32 is in mechanical communication with the motor 24 via the gear train 40 in a similar fashion as the first and second chain paths 28 and 32, as described further below. Thus, the apparatus 20 should not be read as being limited to having only two sets of chains 26 and 30, chain paths 28 and 32, and brakes 34 and 36.

Figure 4:
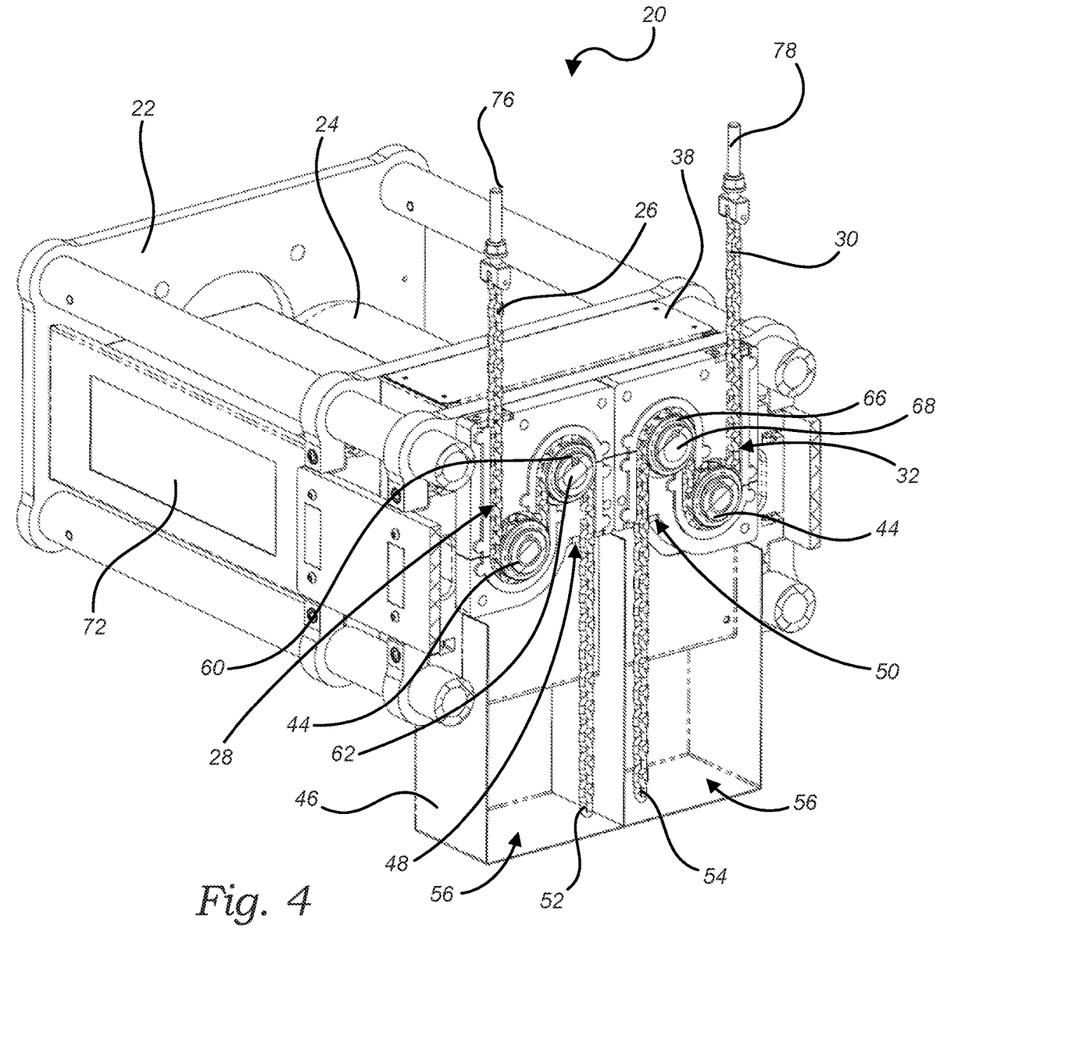
FIG. 4 is a cross-sectional view taken along line 4-4 in FIG. 1.

In at least one embodiment, as illustrated in the cross-sectional view of FIG. 4, each of the first and second chain paths 28 and 32 provides an at least one sprocket 44 positioned and configured for meshing with the corresponding chain 26 or 30 as the chain 26 or 30 passes over the sprocket 44. In at least one further embodiment, each of the first and second chain paths 28 and 32 provides a plurality of sprockets 44 arranged as a pulley system for creating a mechanical advantage. In at least one such embodiment, the first and second chain paths 28 and 32 are mirror images of one another, the reason for which is discussed further below. It should be noted that the sizes, shapes, dimensions, quantities and positions of the sprockets 44 as depicted in the drawings is merely exemplary, such that in further embodiments, the sprockets 44 may take on any other sizes, shapes, dimensions and/or quantities, now known or later developed, and may be positioned and/or arranged elsewhere within the corresponding first and second chain paths 28 and 32, so long as the apparatus 20 is capable of substantially carrying out the functionality described herein. In still further embodiments, other mechanisms capable of selectively moving the first and second chains 26 and 30 through the corresponding first and second chain paths 28 and 32—now known or later developed—may be substituted.

In at least one embodiment, each of the first and second chain paths 28 and 32 further provides a consumable material (such as a bronze or copper spine, for example) to help guide the corresponding chain 26 or 30 therewithin and also prevent wear on the chain 26 or 30.

With continued reference to FIG. 4, in at least one embodiment, the apparatus 20 further provides a chain box 46 positioned proximal a first end 48 and 50 of each of the first and second chain paths 28 and 32. The chain box 46 is configured for selectively storing a free end 52 and 54 (along with an excess length) of each of the first and second chains 26 and 30. In at least one further embodiment, the chain box 46 provides separate internal chain compartments 56 sized and configured for separately storing the excess lengths of each of the first and second chains 26 and 30, so as to prevent the chains 26 and 30 from becoming entangled with one another. It should be noted that the size, shape, dimensions and position of the chain box 46 relative to the housing 22 as depicted in the drawings is merely exemplary, such that in further embodiments, the chain box 46 may take on any other size, shape and/or dimensions, now known or later developed, and may be positioned and/or arranged elsewhere on the housing 22, so long as the apparatus 20 is capable of substantially carrying out the functionality described herein. Similarly, the length of the first and second chains 26 and 30 depicted in the drawings is merely exemplary, such that the chains 26 and 30 may take on any other length, depending on the context in which the apparatus 20 is to be used.

Figure 5:
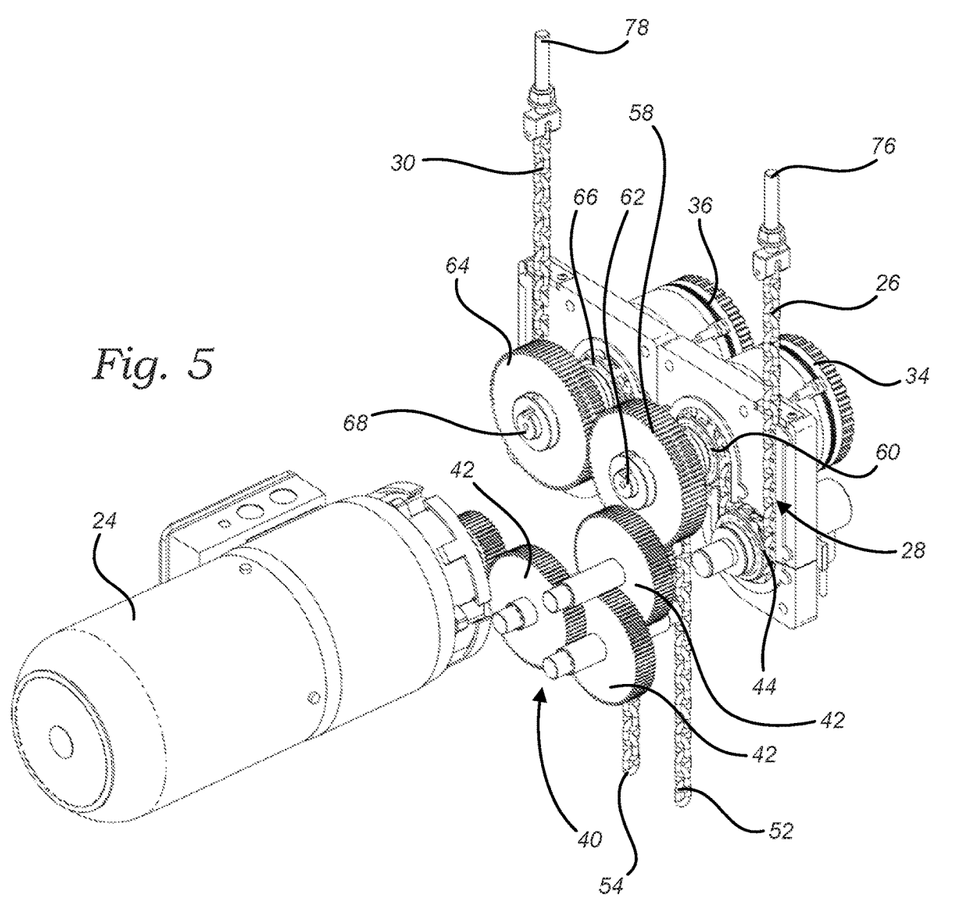
FIG. 5 is a perspective view of an exemplary drivetrain of the exemplary apparatus, in accordance with at least one embodiment.

In at least one embodiment, as illustrated in FIG. 5, the gear train 40 provides a plurality of gears 42 positioned in series between the motor 24 and a first chain gear 58. The first chain gear 58 is in mechanical communication with the first chain path 28 for causing the first chain 26 to selectively move through the first chain path 28. In at least one embodiment, the first chain gear 58 is in mechanical communication with a one of the at least one sprocket 44 within the first chain path 28 (hereinafter referred to as the first primary sprocket 60). In at least one such embodiment, the first chain gear 58 and the first primary sprocket 60 are rotatably positioned on a common shaft 62, such that as the first chain gear 58 rotates, so too does the first primary sprocket 60 in the same direction as the first chain gear 58. Similarly, a second chain gear 64 is in mechanical communication with the second chain path 32 for causing the second chain 30 to selectively move through the second chain path 32. In at least one embodiment, the second chain gear 64 is in mechanical communication with a one of the at least one sprocket 44 within the second chain path 32 (hereinafter referred to as the second primary sprocket 66). In at least one such embodiment, the second chain gear 64 and the second primary sprocket 66 are rotatably positioned on a common shaft 68, such that as the second chain gear 64 rotates, so too does the second primary sprocket 66 in the same direction as the second chain gear 64. In at least one embodiment, the first chain gear 58 and second chain gear 64 are identical in size and shape, and the first chain gear 58 meshes with the second chain gear 64. Thus, as the motor 24 selectively drives the first chain gear 58 (via the gear train 40), the mechanical link between the first and second chain gears 58 and 64 enables the motor 24 to selectively and simultaneously drive the second chain gear 64 as well. Furthermore, in embodiments where the first and second chain gears 58 and 64 are identical in size and shape, the first and second chain gears 58 and 64 are capable of rotating simultaneously and at the same speed which, in turn, enables the first and second chains 26 and 30 to move through the respective first and second chain paths 28 and 32 at the same speed, thereby maintaining a balanced load 70. In other words, this arrangement of gears 42 enables the apparatus 20 to utilize two or more separate, parallel chain paths 28 and 32 (even though the gears 42 are arranged in series) that are driven by a single motor 24 and gear train 40. Thus, should one of the chain paths 28 or 32 experience a failure, the apparatus 20 is nevertheless able to maintain the load 70 by virtue of the remaining redundant chain path(s) 28 or 32, without the need for a separate, redundant motor or gear train (nor any further mechanisms for ensuring synchronized movement of the first and second chains 26 and 30). In at least one embodiment, where the first chain gear 58 meshes directly with the second chain gear 64, the first and second chain gears 58 and 64 (and, in turn, the first and second primary sprockets 60 and 66) rotate in opposite directions. Thus, in at least one such embodiment, the first and second chain paths 28 and 32 are mirror images of one another. As mentioned above, in further embodiments, the gears 42 may take on any other sizes, shapes, dimensions and/or quantities, now known or later developed, and may be positioned and/or arranged elsewhere within the gearbox 38, so long as the apparatus 20 is capable of substantially carrying out the functionality described herein.

Figure 6:
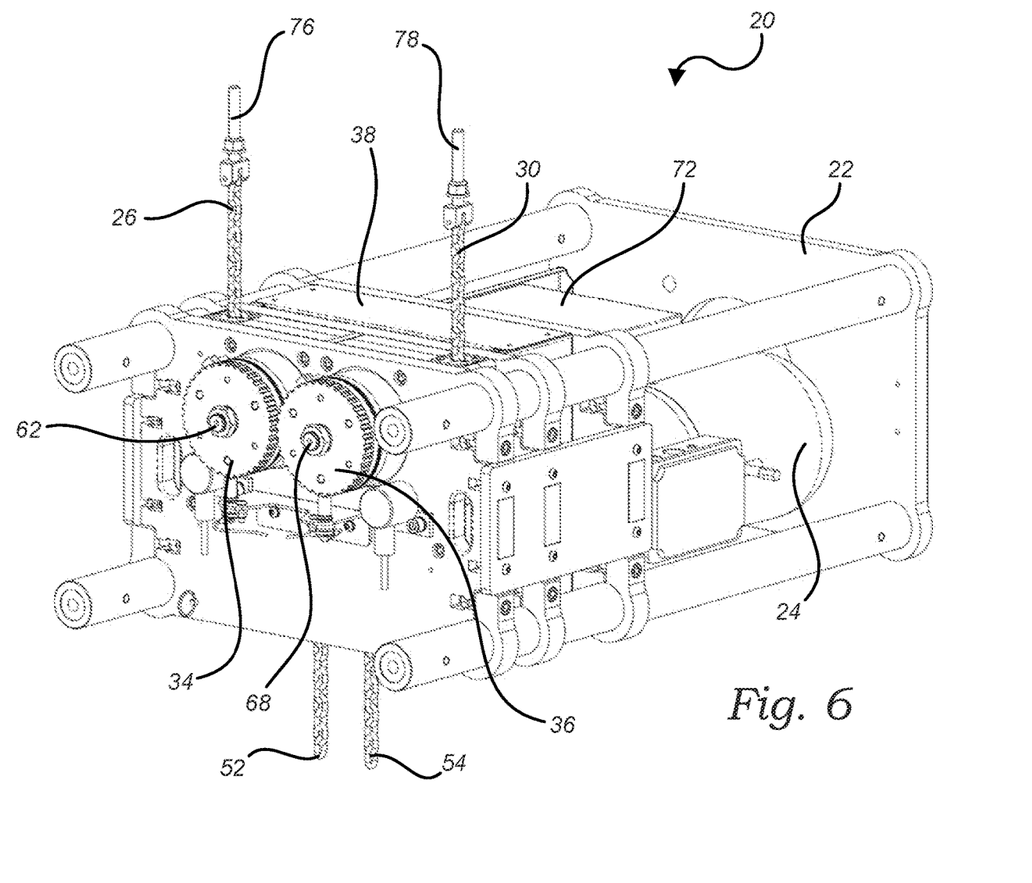
FIG. 6 is a further perspective view of the exemplary apparatus, with an endplate omitted for illustrative purposes, in accordance with at least one embodiment.

As noted above and best illustrated in FIG. 6, in at least one embodiment, the first brake 34 is in mechanical communication with the first chain path 28, and the second brake 36 is in mechanical communication with the second chain path 32. This allows the first and second chain paths 28 and 32 to be independently stopped via the corresponding brake 34 or 36. Thus, should one of the chain paths 28 or 32 experience a failure, the apparatus 20 is nevertheless able to maintain the load 70 and stop the remaining chain path(s) 28 or 32 by virtue of the corresponding brake(s) 34 or 36 in mechanical communication with the remaining chain path(s) 28 or 32. In at least one embodiment, each of the first and second brakes 34 and 36 is at least one of a disc brake, a band brake, a water-cooled brake, a motor brake, an electric brake, etc. However, in further embodiments, each of the first and second brake 34 and 36 may be any other mechanism capable of stopping the corresponding chain path 28 and 32—now known or later developed. Thus, the first and second brakes 34 and 36 should not be read as being limited to only those types of brakes depicted in the drawings.

In at least one embodiment, as illustrated best in FIGS. 1-3, the apparatus 20 further provides a controller 72 in electrical communication with each of the motor 24, the first brake 34 and the second brake 36, such that the controller 72 is configured for selectively operating each of the motor 24, the first brake 34 and the second brake 36. In at least one embodiment, the controller 72 is further configured for automatically monitoring and testing the apparatus 20 for potential mechanical failures. In at least one such embodiment, the controller 72 is configured for testing the first and second brakes 34 and 36 against the motor 24, which has developed torque prior to opening one or both of the first and second brakes 34 and 36 to a preset value. In a bit more detail, the motor 24 applies torque to the gear train 40, at which point the controller 72 opens all but one of the brakes 34 or 36 to verify it can hold; the controller 72 then repeats this process for each of the remaining brakes 34 or 36 until all brakes 34 and 36 have been tested—i.e., the brakes 34 and 36 are tested sequentially rather than simultaneously. If the controller 72 detects any slip in any of the brakes 34 or 36, the controller 72 closes all of the brakes 34 and 36 and notifies a user of the apparatus 20. In at least one embodiment, the controller 72 is further configured for verifying the speed of the motor 24, gear train 40 and first and second chain paths 28 and 32 via encoders. In at least one such embodiment, the encoders are monitored by the controller 72 for automatically placing the apparatus 20 into a "safe mode" in the event the controller 72 determines a deviation between their relative positions.

Figure 7:
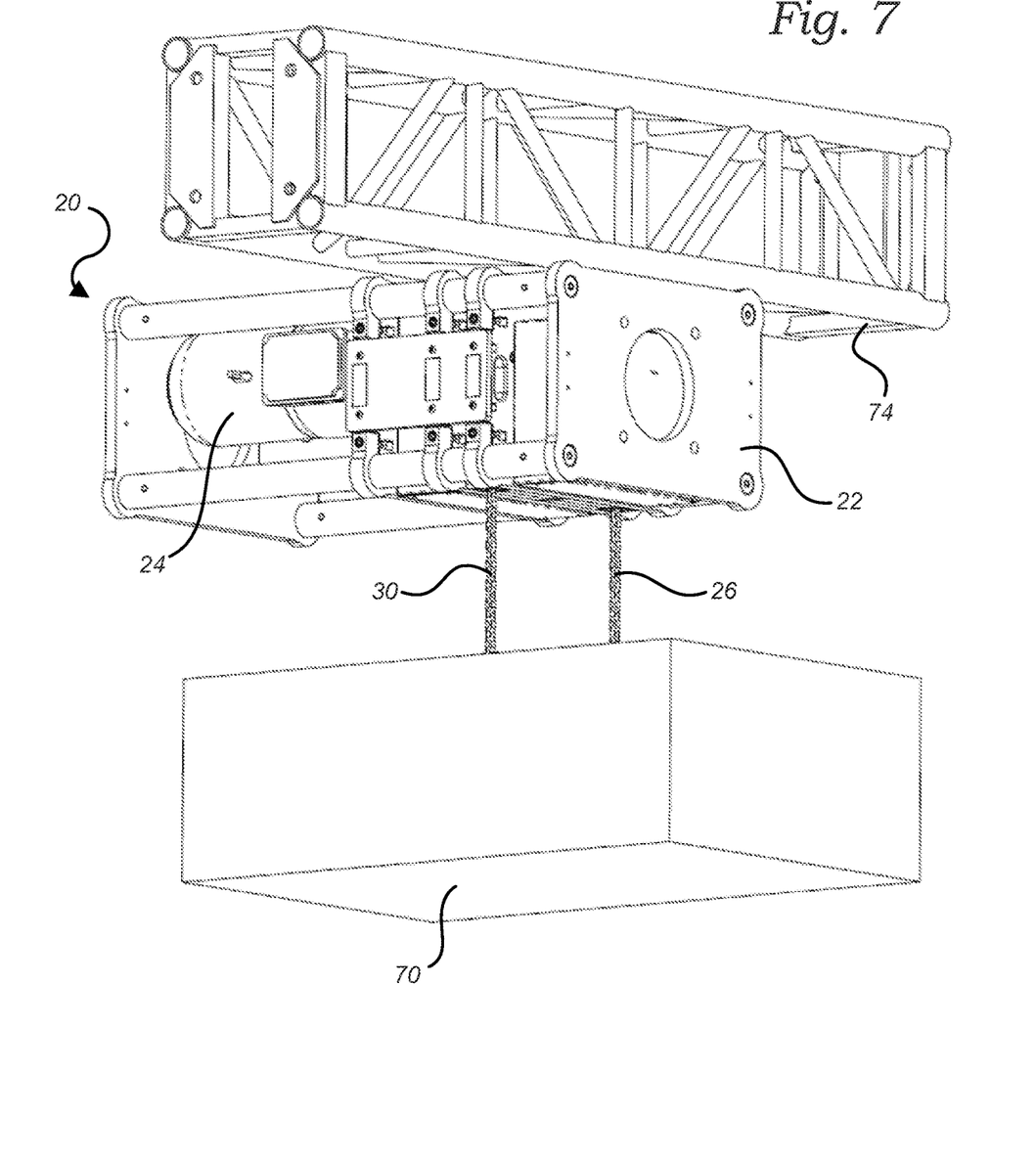
FIG. 7 is a perspective view of the exemplary apparatus operating in a "motor up" configuration, in accordance with at least one embodiment.
Figure 8:
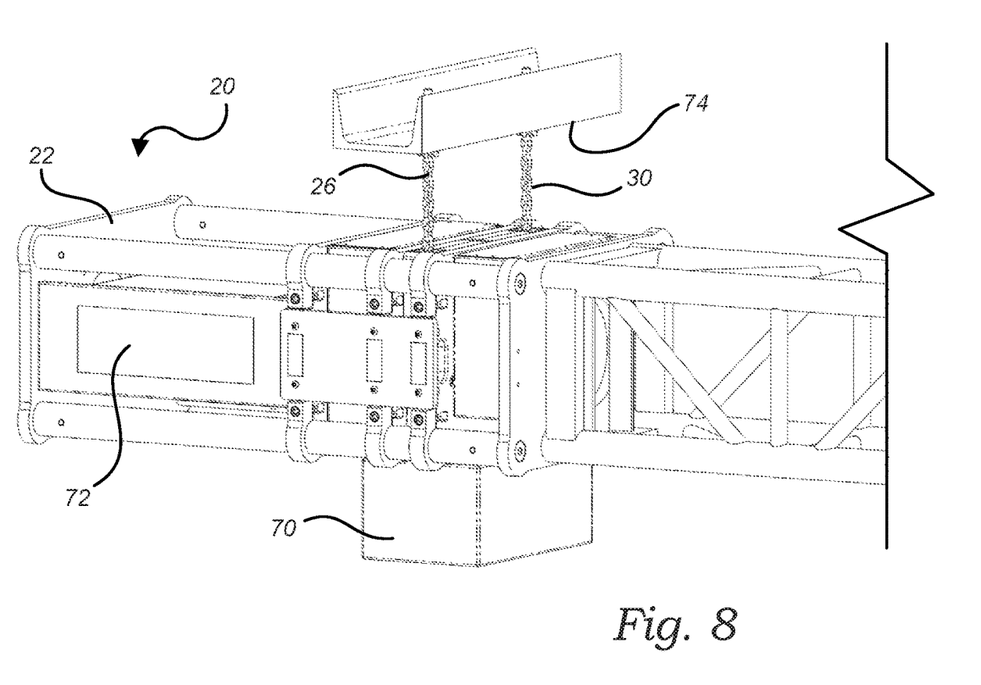
FIG. 8 is a partial perspective view of the exemplary apparatus operating in a "motor down" configuration, in accordance with at least one embodiment.

In at least one embodiment, the apparatus 20 may be configured to operate in either a "motor up" configuration (FIG. 7) or a "motor down" configuration (FIG. 8). In at least one embodiment, where the apparatus 20 is operating in a "motor up" configuration, the housing 22 is secured to an elevated surface 74 (such as a ceiling, truss, etc.) while an opposing engagement end 76 and 78 of each of the first and second chains 26 and 30 is independently engaged with the load 70. In at least one alternate embodiment, where the apparatus 20 is operating in a "motor down" (or "self-climbing") configuration, the housing 22 is secured to the load 70 while the engagement end 76 and 78 of each of the first and second chains 26 and 30 is independently engaged with the elevated surface 74. In either configuration, should one of the chains 26 or 30 (or the brake 34 or 36 associated with one of the chains 26 or 30) fail, the remaining chain(s) 26 or 30/brake(s) 34 or 36 would continue to sustain the load 70. In at least one further embodiment, in larger and/or heavier use cases, multiple units of the apparatus 20 may be engaged between the elevated surface 74 and the load 70 (in either a "motor up" or "motor down" configuration), with the respective controllers 72 of each apparatus 20 configured for operating the respective motors 24 in sync with one another.

Aspects of the present specification may also be described as the following embodiments:

1. A redundant multi-point chain hoist apparatus comprising: a motor; a first chain path sized and configured for slidably receiving a first chain, such that the first chain is capable of being selectively moved therethrough; a separate, redundant second chain path sized and configured for slidably receiving a second chain, such that the second chain is capable of being selectively moved therethrough; a first brake in mechanical communication with the first chain path for selectively preventing the first chain from moving through the first chain path; a second brake in mechanical communication with the second chain path for selectively preventing the second chain from moving through the second chain path; and a gear train comprising a plurality of gears configured for creating parallel mechanical links between the motor and each of the first and second chain paths, such that the motor selectively causes the first and second chains to move in unison yet independently via the separate first and second chain paths; whereby, with the apparatus engaged with each of an elevated surface and a load, the apparatus is capable of selectively lifting, lowering and sustaining the load relative to the elevated surface via each of the first and second chains, even if one of the first or second chains, chain paths, or brakes should experience a failure.

2. The chain hoist apparatus according to embodiment 1, further comprising a housing sized and configured for supporting each of the motor, the first chain, the first chain path, the second chain, the second chain path, the first brake, the second brake, and the gear train.

3. The chain hoist apparatus according to embodiments 1-2, wherein the gear train is positioned within a gearbox.

4. The chain hoist apparatus according to embodiments 1-3, wherein: the first chain path provides an at least one first sprocket positioned and configured for meshing with the first chain as the first chain passes over the first sprocket; and the second chain path provides an at least one second sprocket positioned and configured for meshing with the second chain as the second chain passes over the second sprocket.

5. The chain hoist apparatus according to embodiments 1-4, wherein: the first chain path provides a plurality of first sprockets arranged as a pulley system; and the second chain path provides a plurality of second sprockets arranged as a pulley system.

6. The chain hoist apparatus according to embodiments 1-5, further comprising a chain box positioned proximal a first end of each of the first and second chain paths, the chain box configured for selectively storing a free end, along with any excess length, of each of the first and second chains.

7. The chain hoist apparatus according to embodiments 1-6, wherein the chain box provides separate internal chain compartments sized and configured for separately storing the free end, along with any excess length, of each of the first and second chains.

8. The chain hoist apparatus according to embodiments 1-7, further comprising: a first chain gear in mechanical communication with the first chain path for causing the first chain to selectively move through the first chain path; a second chain gear in mechanical communication with the second chain path for causing the second chain to selectively move through the second chain path; wherein, the first chain gear is mechanically linked to the second chain gear; and wherein, the gears of the gear train are positioned in series between the motor and the first chain gear; whereby, as the motor selectively drives the first chain gear via the gear train, the mechanical link between the first and second chain gears enables the motor to selectively and simultaneously drive the second chain gear as well.

9. The chain hoist apparatus according to embodiments 1-8, wherein: the first chain gear is in mechanical communication with a primary one of the at least one first sprocket within the first chain path; and the second chain gear is in mechanical communication with a primary one of the at least one second sprocket within the second chain path.

10. The chain hoist apparatus according to embodiments 1-9, wherein: the first chain gear and the primary one of the at least one first sprocket are rotatably positioned on a common first shaft, such that as the first chain gear rotates, so too does said first primary sprocket in the same direction as the first chain gear; and the second chain gear and the primary one of the at least one second sprocket are rotatably positioned on a common second shaft, such that as the second chain gear rotates, so too does said second primary sprocket in the same direction as the second chain gear.

11. The chain hoist apparatus according to embodiments 1-10, wherein the first chain gear and second chain gear are identical in size and shape, such that the first and second chain gears are capable of rotating simultaneously and at the same speed which, in turn, enables the first and second chains to move through the respective first and second chain paths at the same speed.

12. The chain hoist apparatus according to embodiments 1-11, wherein the first chain gear meshes with the second chain gear.

13. The chain hoist apparatus according to embodiments 1-12, wherein the first and second chain gears rotate in opposite directions.

14. The chain hoist apparatus according to embodiments 1-13, wherein, the first and second chain paths are mirror images of one another.

15. The chain hoist apparatus according to embodiments 1-14, wherein each of the first and second brakes is at least one of a disc brake, a band brake, a water-cooled brake, and an electric brake.

16. The chain hoist apparatus according to embodiments 1-15, further comprising a controller in electrical communication with each of the motor, the first brake and the second brake, such that the controller is configured for selectively operating each of the motor, the first brake and the second brake.

17. The chain hoist apparatus according to embodiments 1-16, wherein the housing is secured to the elevated surface and an opposing engagement end of each of the first and second chains is independently engaged with the load, such that the apparatus operates in a "motor up" configuration.

18. The chain hoist apparatus according to embodiments 1-17, wherein the housing is secured to the load and an opposing engagement end of each of the first and second chains is independently engaged with the elevated surface, such that the apparatus operates in a "motor down" configuration.

19. A redundant multi-point chain hoist apparatus comprising: a motor; a first chain path sized and configured for slidably receiving a first chain, the first chain path providing an at least one first sprocket positioned and configured for meshing with the first chain as the first chain passes over the first sprocket, thereby selectively moving the first chain through the first chain path; a separate, redundant second chain path sized and configured for slidably receiving a second chain, the second chain path providing an at least one second sprocket positioned and configured for meshing with the second chain as the second chain passes over the second sprocket, thereby selectively moving the second chain through the second chain path; a first chain gear in mechanical communication with the at least one first sprocket; a second chain gear in mechanical communication with each of the first chain gear and the at least one second sprocket; a gear train comprising a plurality of gears positioned in series between the motor and the first chain gear, thereby creating parallel mechanical links between the motor and each of the first and second chain paths, such that the motor selectively causes the first and second chains to move in unison yet independently via the separate first and second chain paths; a first brake in mechanical communication with the first chain path for selectively preventing the first chain from moving through the first chain path; and a second brake in mechanical communication with the second chain path for selectively preventing the second chain from moving through the second chain path; whereby, with the apparatus engaged with each of an elevated surface and a load, the apparatus is capable of selectively lifting, lowering and sustaining the load relative to the elevated surface via each of the first and second chains, even if one of the first or second chains, chain paths, or brakes should experience a failure.

20. A redundant multi-point chain hoist apparatus comprising: a motor; a first chain path sized and configured for slidably receiving a first chain, the first chain path providing an at least one first sprocket positioned and configured for meshing with the first chain as the first chain passes over the first sprocket, thereby selectively moving the first chain through the first chain path; a separate, redundant second chain path sized and configured for slidably receiving a second chain, the second chain path providing an at least one second sprocket positioned and configured for meshing with the second chain as the second chain passes over the second sprocket, thereby selectively moving the second chain through the second chain path; a first chain gear in mechanical communication with the at least one first sprocket; a second chain gear in mechanical communication with each of the first chain gear and the at least one second sprocket; a gear train comprising a plurality of gears positioned in series between the motor and the first chain gear, thereby creating parallel mechanical links between the motor and each of the first and second chain paths, such that the motor selectively causes the first and second chains to move in unison yet independently via the separate first and second chain paths; the first and second chain gears being identical in size and shape such that the first and second chain gears are capable of rotating simultaneously and at the same speed which, in turn, enables the first and second chains to move through the respective first and second chain paths at the same speed; a first brake in mechanical communication with the first chain path for selectively preventing the first chain from moving through the first chain path; and a second brake in mechanical communication with the second chain path for selectively preventing the second chain from moving through the second chain path; whereby, with the apparatus engaged with each of an elevated surface and a load, the apparatus is capable of selectively lifting, lowering and sustaining the load relative to the elevated surface via each of the first and second chains, even if one of the first or second chains, chain paths, or brakes should experience a failure.

In closing, regarding the exemplary embodiments of the present invention as shown and described herein, it will be appreciated that a redundant multi-point chain hoist apparatus is disclosed and configured for providing at least two redundant load paths capable of sustaining an associated load even in the event of a failure. Because the principles of the invention may be practiced in a number of configurations beyond those shown and described, it is to be understood that the invention is not in any way limited by the exemplary embodiments, but is generally directed to a redundant multi-point chain hoist apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicant and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A redundant multi-point chain hoist apparatus comprising:
   a motor;
   a first chain path sized and configured for slidably receiving a first chain, the first chain path providing an at least one first sprocket positioned and configured for meshing with the first chain as the first chain passes over the at least one first sprocket, thereby selectively moving the first chain through the first chain path;
   a separate, redundant second chain path sized and configured for slidably receiving a second chain, the second chain path providing an at least one second sprocket positioned and configured for meshing with the second chain as the second chain passes over the at least one second sprocket, thereby selectively moving the second chain through the second chain path;
   a first brake in mechanical communication with the first chain path for selectively preventing the first chain from moving through the first chain path;
   a second brake in mechanical communication with the second chain path for selectively preventing the second chain from moving through the second chain path;
   a first chain gear in mechanical communication with the at least one first sprocket for causing the at least one first sprocket to selectively rotate;
   a second chain gear in mechanical communication with the at least one second sprocket for causing the at least one second sprocket to selectively rotate; and
   a gear train comprising a plurality of gears configured for creating parallel mechanical links between the motor and each of the first and second chain gears, such that the motor selectively causes the first and second chains to move in unison yet independently via the separate first and second chain paths;
   whereby, with the apparatus engaged with each of an elevated surface and a load, the apparatus is capable of selectively lifting, lowering and sustaining the load relative to the elevated surface via each of the first and second chains, even if one of the first or second chains, chain paths, or brakes should experience a failure.

2. The chain hoist apparatus of claim 1, further comprising a housing sized and configured for supporting each of the motor, the first chain, the first chain path, the second chain, the second chain path, the first brake, the second brake, and the gear train.

3. The chain hoist apparatus of claim 2, wherein the housing is secured to the elevated surface and an opposing engagement end of each of the first and second chains is independently engaged with the load, such that the apparatus operates in a "motor up" configuration.

4. The chain hoist apparatus of claim 2, wherein the housing is secured to the load and an opposing engagement end of each of the first and second chains is independently engaged with the elevated surface, such that the apparatus operates in a "motor down" configuration.

5. The chain hoist apparatus of claim 1, wherein the gear train is positioned within a gearbox.

6. The chain hoist apparatus of claim 1, wherein:
the first chain path provides a plurality of first sprockets arranged as a pulley system; and
the second chain path provides a plurality of second sprockets arranged as a pulley system.

7. The chain hoist apparatus of claim 1, further comprising a chain box positioned proximal a first end of each of the first and second chain paths, the chain box configured for selectively storing a free end, along with any excess length, of each of the first and second chains.

8. The chain hoist apparatus of claim 7, wherein the chain box provides separate internal chain compartments sized and configured for separately storing the free end, along with any excess length, of each of the first and second chains.

9. The chain hoist apparatus of claim 1, wherein:
the first chain gear is mechanically linked to the second chain gear; and
the gears of the gear train are positioned in series between the motor and the first chain gear;
whereby, as the motor selectively drives the first chain gear via the gear train, the mechanical link between the first and second chain gears enables the motor to selectively and simultaneously drive the second chain gear as well.

10. The chain hoist apparatus of claim 9, wherein:
the first chain gear is in mechanical communication with a primary one of the at least one first sprocket within the first chain path; and
the second chain gear is in mechanical communication with a primary one of the at least one second sprocket within the second chain path.

11. The chain hoist apparatus of claim 10, wherein:
the first chain gear and the primary one of the at least one first sprocket are rotatably positioned on a common first shaft, such that as the first chain gear rotates, so too does said first primary sprocket in the same direction as the first chain gear; and
the second chain gear and the primary one of the at least one second sprocket are rotatably positioned on a common second shaft, such that as the second chain gear rotates, so too does said second primary sprocket in the same direction as the second chain gear.

12. The chain hoist apparatus of claim 9, wherein the first chain gear and second chain gear are identical in size and shape, such that the first and second chain gears are capable of rotating simultaneously and at the same speed which, in turn, enables the first and second chains to move through the respective first and second chain paths at the same speed.

13. The chain hoist apparatus of claim 12, wherein the first chain gear meshes with the second chain gear.

14. The chain hoist apparatus of claim 13, wherein the first and second chain gears rotate in opposite directions.

15. The chain hoist apparatus of claim 14, wherein, the first and second chain paths are mirror images of one another.

16. The chain hoist apparatus of claim 1, wherein each of the first and second brakes is at least one of a disc brake, a band brake, a water-cooled brake, and an electric brake.

17. The chain hoist apparatus of claim 1, further comprising a controller in electrical communication with each of the motor, the first brake and the second brake, such that the controller is configured for selectively operating each of the motor, the first brake and the second brake.

18. A redundant multi-point chain hoist apparatus comprising:
a motor;
a first chain path sized and configured for slidably receiving a first chain, the first chain path providing an at least one first sprocket positioned and configured for meshing with the first chain as the first chain passes over the first sprocket, thereby selectively moving the first chain through the first chain path;
a separate, redundant second chain path sized and configured for slidably receiving a second chain, the second chain path providing an at least one second sprocket positioned and configured for meshing with the second chain as the second chain passes over the second sprocket, thereby selectively moving the second chain through the second chain path;
a first chain gear in mechanical communication with the at least one first sprocket;
a second chain gear in mechanical communication with each of the first chain gear and the at least one second sprocket;
a gear train comprising a plurality of gears positioned in series between the motor and the first chain gear, thereby creating parallel mechanical links between the motor and each of the first and second chain paths, such that the motor selectively causes the first and second chains to move in unison yet independently via the separate first and second chain paths;
a first brake in mechanical communication with the first chain path for selectively preventing the first chain from moving through the first chain path; and
a second brake in mechanical communication with the second chain path for selectively preventing the second chain from moving through the second chain path;
whereby, with the apparatus engaged with each of an elevated surface and a load, the apparatus is capable of selectively lifting, lowering and sustaining the load relative to the elevated surface via each of the first and second chains, even if one of the first or second chains, chain paths, or brakes should experience a failure.

19. A redundant multi-point chain hoist apparatus comprising:
a motor;
a first chain path sized and configured for slidably receiving a first chain, the first chain path providing an at least one first sprocket positioned and configured for meshing with the first chain as the first chain passes over the first sprocket, thereby selectively moving the first chain through the first chain path;
a separate, redundant second chain path sized and configured for slidably receiving a second chain, the second chain path providing an at least one second sprocket positioned and configured for meshing with the second chain as the second chain passes over the second sprocket, thereby selectively moving the second chain through the second chain path;
a first chain gear in mechanical communication with the at least one first sprocket;
a second chain gear in mechanical communication with each of the first chain gear and the at least one second sprocket;
a gear train comprising a plurality of gears positioned in series between the motor and the first chain gear, thereby creating parallel mechanical links between the motor and each of the first and second chain paths, such that the motor selectively causes the first and second chains to move in unison yet independently via the separate first and second chain paths;

the first and second chain gears being identical in size and shape such that the first and second chain gears are capable of rotating simultaneously and at the same speed which, in turn, enables the first and second chains to move through the respective first and second chain paths at the same speed;

a first brake in mechanical communication with the first chain path for selectively preventing the first chain from moving through the first chain path; and a second brake in mechanical communication with the second chain path for selectively preventing the second chain from moving through the second chain path;

whereby, with the apparatus engaged with each of an elevated surface and a load, the apparatus is capable of selectively lifting, lowering and sustaining the load relative to the elevated surface via each of the first and second chains, even if one of the first or second chains, chain paths, or brakes should experience a failure.

\* \* \* \* \*